UNITED STATES PATENT OFFICE.

HAROLD HIBBERT AND HAROLD ARTHUR MORTON, OF PITTSBURGH, PENNSYLVANIA, ASSIGNORS TO UNION CARBIDE COMPANY, OF NEW YORK, N. Y., A CORPORATION OF VIRGINIA.

METHOD OF MAKING ACETALDEHYDE.

1,213,487.     Specification of Letters Patent.     Patented Jan. 23, 1917.

No Drawing.     Application filed November 5, 1915. Serial No. 59,837.

*To all whom it may concern:*

Be it known that we, HAROLD HIBBERT, a subject of the King of England, and HAROLD ARTHUR MORTON, a citizen of the United States, residing at Pittsburgh, in the county of Allegheny and State of Pennsylvania, have invented certain new and useful Improvements in Methods of Making Acetaldehyde, of which the following is a specification.

In the manufacture of acetaldehyde from acetylene, it has been proposed heretofore to pass acetylene through a solution of a mercury salt in sulfuric, phosphoric or benzene-sulfonic acid, the mercury salt serving as a catalyzer in promoting the addition of water to the acetylene, with the resulting formation of acetaldehyde. In the practice of such processes, it is highly desirable that the temperature of the bath should be sufficiently maintained so that the acetaldehyde may be continuously distilled off; but in operating at such temperatures it has heretofore been necessary, in order to avoid material production of crotonic aldehyde and other objectionable side products, to employ acid of relatively low concentration, for example below 60 grams of $SO_4$ per 1,000 grams of water.

In a copending application Serial No. 59,836, filed Nov. 5, 1915, we have disclosed a method according to which it is possible to employ under these conditions acid solutions of materially higher concentration, by adding thereto a salt or salts of a relatively weak acid, typical examples of such salts being the borates and phosphates of the alkali metals. By the term "salt of a relatively weak acid" we mean to include the salt of any acid, the ionization constant of which in a six-per-cent. aqueous solution is less than that of a sulfuric acid solution of the same equivalent concentration.

According to the present invention we employ instead of sulfuric or equivalent acids, the appropriate acid salts, as for example the acid sulfates of sodium or potassium, the acid phosphates of these metals, the acid salts of polybasic acids such as disulfonic acid or the like. By the term "acid salt", we designate any salt in which a part only of the replaceable hydrogen is substituted by a metal. We have discovered that we are thereby enabled to employ solutions of relatively high concentration without the formation of undesirable products such as crotonic aldehyde or the like. This result is attributable to the fact that solutions of such acid salts, although containing the ion $HSO_4^-$ or its equivalents, are substantially free from hydrogen ions.

An illustrative example of the process is as follows: To 3.4 liters of a solution of acid potassium sulfate ($KHSO_4$), containing 80 grams of $SO_4$ per 1,000 grams of water, we add 240 grams of mercuric oxid; and into this solution we introduce acetylene at the rate of about 3.7 cubic feet per hour, the temperature of the solution being maintained above 70° C. and preferably at about 75° C. Under these conditions the acetaldehyde distils over continuously and may be condensed in the customary way. A yield of about 90 per cent. acetaldehyde is obtained and the product is found to be free from crotonic aldehyde. The use of these relatively concentrated solutions of acid salts offers the advantages, in addition to freedom from production of crotonic aldehyde, that:—(1) The absorption of the acetylene is more rapid and complete than when sulfuric acid is used. (2) Owing to the lesser solubility of acetaldehyde in the aqueous solution of potassium bisulfate as compared with dilute sulfuric acid, the acetaldehyde distils off more easily and rapidly, so that if the process is interrupted it is found that only a very small proportion of acetaldehyde remains in solution.

In case it is desired to employ acid salt solutions of still higher concentration, there may be added to such solutions a salt or salts of a relatively weak acid, as for example a soluble borate or phosphate, the effect of such additions being to reduce the concentration of the hydrogen ions in the solution as more fully pointed out in our copending application above referred to.

We claim:—

1. The method of making acetaldehyde, which consists in introducing acetylene into a solution containing an acid salt of a strong acid, said solution substantially free from hydrogen ions, and containing also a salt of mercury.

2. The method of making acetaldehyde, which consists in introducing acetylene into a solution containing an acid salt of a strong acid, said solution substantially free from hydrogen ions and containing also a salt of mercury, and simultaneously distilling acetaldehyde from the solution.

3. The method of making acetaldehyde, which consists in introducing acetylene into a solution containing the ion $HSO_4^-$ but substantially free from hydrogen ions, said solution containing also a salt of mercury.

4. The method of making acetaldehyde, which consists in introducing acetylene into a solution containing the ion $HSO_4^-$ but substantially free from hydrogen ions, said solution containing also a salt of mercury, and simultaneously distilling acetaldehyde from the solution.

5. The method of making acetaldehyde, which consists in introducing acetylene into a solution containing an acid salt of a strong acid, said solution substantially free from hydrogen ions, and containing also a salt of mercury and a salt of a relatively weak acid.

6. The method of making acetaldehyde, which consists in introducing acetylene into a solution containing an acid salt of a strong acid, said solution substantially free from hydrogen ions and containing also a salt of mercury and a salt of a relatively weak acid, and simultaneously distilling acetaldehyde from the solution.

7. The method of making acetaldehyde, which consists in introducing acetylene into a solution containing the ion $HSO_4^-$ but substantially free from hydrogen ions, said solution containing also a salt of mercury and a salt of a relatively weak acid.

8. The method of making acetaldehyde, which consists in introducing acetylene into a solution containing the ion $HSO_4^-$ but substantially free from hydrogen ions, said solution containing also a salt of mercury and a salt of a relatively weak acid, and simultaneously distilling acetaldehyde from the solution.

In testimony whereof, we affix our signatures in presence of two witnesses.

HAROLD HIBBERT.
HAROLD ARTHUR MORTON.

Witnesses:
S. C. PERRING,
GEO. B. NICKEL.